United States Patent
Okada

(10) Patent No.: US 10,477,065 B2
(45) Date of Patent: Nov. 12, 2019

(54) IMAGE SCANNING APPARATUS, AND METHOD AND COMPUTER-READABLE MEDIUM THEREFOR

(71) Applicant: BROTHER KOGYO KABUSHIKI KAISHA, Nagoya, Aichi (JP)

(72) Inventor: Hidekazu Okada, Hashima (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 15/925,934

(22) Filed: Mar. 20, 2018

(65) Prior Publication Data

US 2018/0343361 A1 Nov. 29, 2018

(30) Foreign Application Priority Data

May 23, 2017 (JP) .................................. 2017-101507

(51) Int. Cl.
*H04N 1/387* (2006.01)
*H04N 1/00* (2006.01)

(52) U.S. Cl.
CPC ......... *H04N 1/3878* (2013.01); *H04N 1/0066* (2013.01); *H04N 1/00588* (2013.01); *H04N 1/00718* (2013.01); *H04N 1/00721* (2013.01); *H04N 1/00774* (2013.01)

(58) Field of Classification Search
CPC .................................................... H04N 1/3878
USPC ....................................................... 358/1.15
See application file for complete search history.

(56) References Cited

U.S. PATENT DOCUMENTS

| | | | | |
|---|---|---|---|---|
| 5,586,479 | A | * 12/1996 | Roy | ....................... B26D 7/015 346/24 |
| 2011/0317230 | A1 | 12/2011 | Tanaka | |
| 2015/0319335 | A1 | * 11/2015 | Baba | ....................... H04N 1/047 358/447 |
| 2015/0373219 | A1 | * 12/2015 | Watanabe | .......... H04N 1/00748 358/488 |
| 2016/0261758 | A1 | 9/2016 | Kimura | |

FOREIGN PATENT DOCUMENTS

| | | |
|---|---|---|
| JP | H02-31558 A | 2/1990 |
| JP | 2004-193738 A | 7/2004 |
| JP | 5077394 B2 | 11/2012 |
| JP | 2016-163168 A | 9/2016 |

\* cited by examiner

*Primary Examiner* — Jacky X Zheng
(74) *Attorney, Agent, or Firm* — Scully, Scott, Murphy & Presser, P.C.

(57) ABSTRACT

An image scanning apparatus includes a distance detector configured to output a detection signal having a value corresponding to a distance in a main scanning direction from a particular position to a side end of a document sheet being conveyed, and a controller configured to store a first position of the document sheet in a conveyance direction when the distance detector outputs a detection signal having a first value corresponding to a first particular distance, store a second position of the document sheet in the conveyance direction when the distance detector outputs a detection signal having a second value corresponding to a second particular distance, and calculate a skew angle of the document sheet based on the first position and the second position.

20 Claims, 10 Drawing Sheets

IMAGE SCANNING APPARATUS, AND METHOD AND COMPUTER-READABLE MEDIUM THEREFOR

CROSS-REFERENCE TO RELATED APPLICATION

This application claims priority under 35 U.S.C. § 119 from Japanese Patent Application No. 2017-101507 filed on May 23, 2017. The entire subject matter of the application is incorporated herein by reference.

BACKGROUND

Technical Field

Aspects of the present disclosure are related to an image scanning apparatus, and a method and a non-transitory computer-readable medium therefor.

Related Art

As one of image scanning apparatuses to scan an image of a document sheet along a main scanning direction while conveying the document sheet in a conveyance direction perpendicular to the main scanning direction, an image scanning apparatus configured to detect a skew angle of the document sheet has been known. The skew angle is an angle, relative to the main scanning direction, of a leading end of the document sheet being conveyed in a skewed state where the leading end is inclined relative to the main scanning direction. In other words, the skew angle is an angle, relative to the conveyance direction, of a side end of the document sheet being conveyed in a skewed state where the side end is inclined relative to the conveyance direction.

The known image scanning apparatus may detect the leading end of the document sheet by two sensors arranged side by side along the main scanning direction. Based on respective detection signals from the two sensors, the known apparatus may determine a time difference between two points of time at which the two sensors have detected the leading end, respectively. Thus, the known apparatus may calculate the skew angle from the time difference.

SUMMARY

However, the known image scanning apparatus calculates the skew angle based on the respective detection signals from the two sensors, in advance of image scanning of the document sheet. Therefore, the known apparatus is unable to detect the skew angle of the document sheet being conveyed.

Aspects of the present disclosure are advantageous to provide one or more techniques, for an image scanning apparatus, which make it possible to detect a skew angle of a document sheet being conveyed.

According to aspects of the present disclosure, an image scanning apparatus is provided, which includes a document tray, an image scanner configured to scan an image of a document sheet being conveyed from the document tray, along a main scanning direction, a conveyor configured to convey the document sheet placed on the document tray, in a conveyance direction perpendicular to the main scanning direction, at least one distance detector configured to output a detection signal having a value corresponding to a distance in the main scanning direction from a particular position to a side end of the document sheet being conveyed by the conveyor, the side end being a side of the document sheet that is substantially along the conveyance direction, a storage, and a controller. The controller is configured to perform a first determining process to determine whether the at least one distance detector has output a detection signal having a first value corresponding to a first particular distance, a first storing process to, when determining that the at least one distance detector has output a detection signal having the first value, store into the storage a first position of the document sheet in the conveyance direction relative to an initial position of the document sheet placed on the document tray, the first position being a position of the document sheet at a point of time when the at least one distance detector has output the detection signal having the first value, a second determining process to determine whether the at least one distance detector has output a detection signal having a second value corresponding to a second particular distance, the second particular distance being shorter than the first particular distance, a second storing process to, when determining that the at least one distance detector has output the detection signal having the second value, store into the storage a second position of the document sheet in the conveyance direction relative to the initial position, the second position being a position of the document sheet at a point of time when the at least one distance detector has output the detection signal having the second value, and a skew angle calculating process to calculate a skew angle of the document sheet based on the first position and the second position, the skew angle being an angle, relative to the conveyance direction, of the side end of the document sheet being conveyed by the conveyor.

According to aspects of the present disclosure, further provided is a method implementable on a processor coupled with an image scanning apparatus. The image scanning apparatus includes a document tray, an image scanner configured to scan an image of a document sheet being conveyed from the document tray, along a main scanning direction, a conveyor configured to convey the document sheet placed on the document tray, in a conveyance direction perpendicular to the main scanning direction, a distance detector configured to output a detection signal having a value corresponding to a distance in the main scanning direction from a particular position to a side end of the document sheet being conveyed by the conveyor, the side end being a side of the document sheet that is substantially along the conveyance direction, and a storage. The method includes a first determining process of determining whether the distance detector has output a detection signal having a first value corresponding to a first particular distance, a first storing process of, when determining that the distance detector has output a detection signal having the first value, storing into the storage a first position of the document sheet in the conveyance direction relative to an initial position of the document sheet placed on the document tray, the first position being a position of the document sheet at a point of time when the distance detector has output the detection signal having the first value, a second determining process of determining whether the distance detector has output a detection signal having a second value corresponding to a second particular distance, the second particular distance being shorter than the first particular distance, a second storing process of, when determining that the distance detector has output the detection signal having the second value, storing into the storage a second position of the document sheet in the conveyance direction relative to the initial position, the second position being a position of the document sheet at a point of time when the distance detector has output the detection signal having the second value, and a skew angle calculating process of calculating a skew angle of the document sheet based on the first position and the second position, the skew angle being an angle, relative to the conveyance direction, of the side end of the document sheet being conveyed by the conveyor.

According to aspects of the present disclosure, further provided is a non-transitory computer-readable medium storing computer-readable instructions that are executable by a processor coupled with an image scanning apparatus. The image scanning apparatus includes a document tray, an image scanner configured to scan an image of a document sheet being conveyed from the document tray, along a main scanning direction, a conveyor configured to convey the document sheet placed on the document tray, in a conveyance direction perpendicular to the main scanning direction, at least one distance detector configured to output a detection signal having a value corresponding to a distance in the main scanning direction from a particular position to a side end of the document sheet being conveyed by the conveyor, the side end being a side of the document sheet that is substantially along the conveyance direction, and a storage. The instructions are configured to, when executed by the processor, cause the processor to perform a first determining process to determine whether the at least one distance detector has output a detection signal having a first value corresponding to a first particular distance, a first storing process to, when determining that the at least one distance detector has output a detection signal having the first value, store into the storage a first position of the document sheet in the conveyance direction relative to an initial position of the document sheet placed on the document tray, the first position being a position of the document sheet at a point of time when the at least one distance detector has output the detection signal having the first value, a second determining process to determine whether the at least one distance detector has output a detection signal having a second value corresponding to a second particular distance, the second particular distance being shorter than the first particular distance, a second storing process to, when determining that the at least one distance detector has output the detection signal having the second value, store into the storage a second position of the document sheet in the conveyance direction relative to the initial position, the second position being a position of the document sheet at a point of time when the at least one distance detector has output the detection signal having the second value, and a skew angle calculating process to calculate a skew angle of the document sheet based on the first position and the second position, the skew angle being an angle, relative to the conveyance direction, of the side end of the document sheet being conveyed by the conveyor.

BRIEF DESCRIPTION OF THE ACCOMPANYING DRAWINGS

Figure 10A:
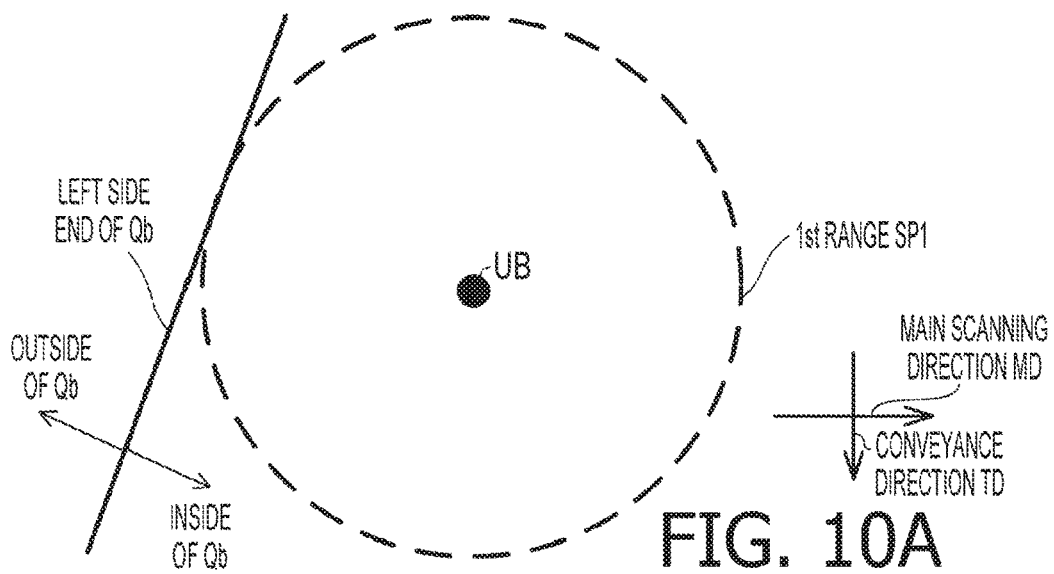

FIG. 10A schematically shows a positional relationship between a left side end of a document sheet Qb and a first range SP1 within which, when detecting the left side end of the document sheet Qb, an ultrasonic sensor UB outputs a detection signal having a value equal to or more than a first threshold TH1, in the illustrative embodiment according to one or more aspects of the present disclosure.

Figure 10B:
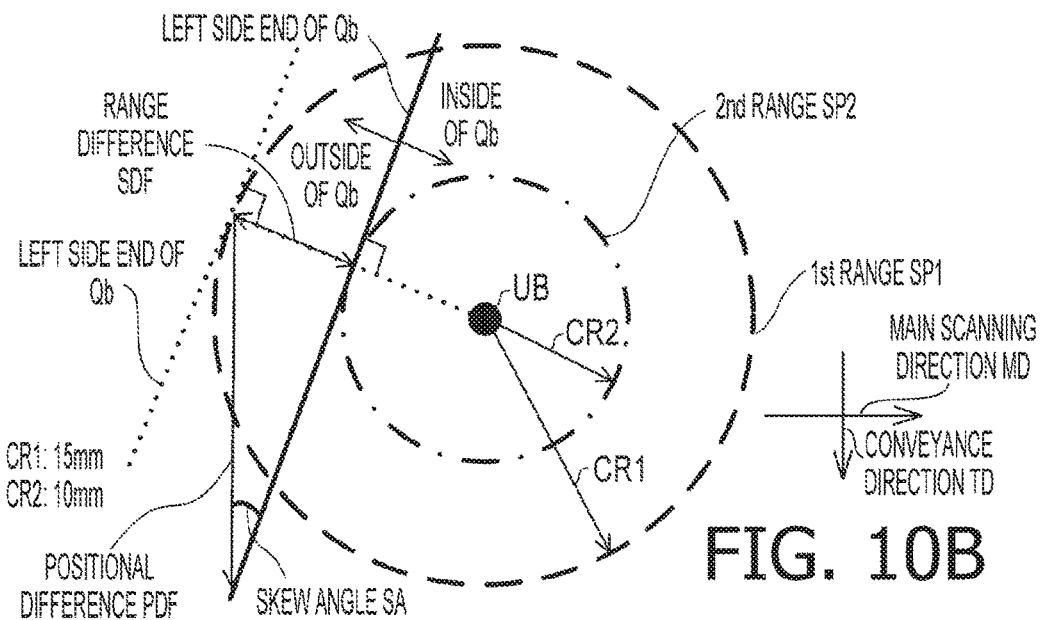

FIG. 10B schematically shows a positional relationship between the left side end of the document sheet Qb and a second range SP2 within which, when detecting the left side end of the document sheet Qb, the ultrasonic sensor UB outputs a detection signal having a value equal to or more than a second threshold TH2, in the illustrative embodiment according to one or more aspects of the present disclosure.

Figure 10C:
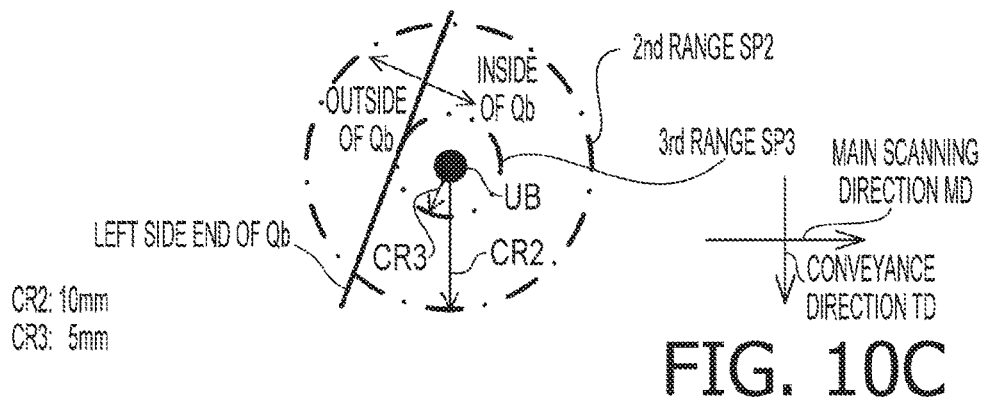

FIG. 10C schematically shows a positional relationship between the left side end of the document sheet Qb and a third range SP3 within which, when detecting the left side end of the document sheet Qb, the ultrasonic sensor UB outputs a detection signal having a value equal to or more than a third threshold TH3, in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

<Configuration of Image Scanning Apparatus>

Figure 1:
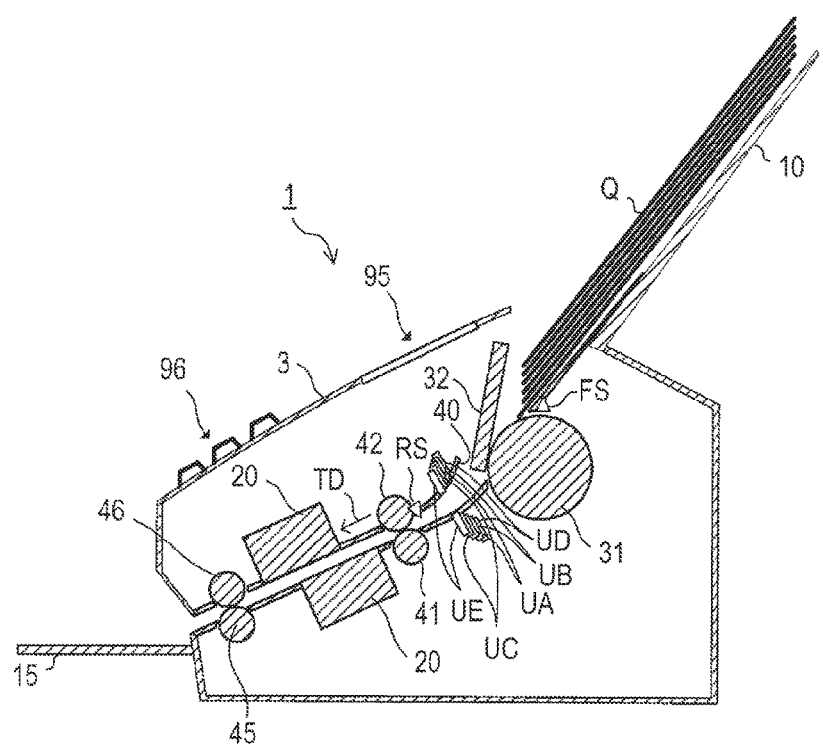
FIG. 1 is a cross-sectional view schematically showing an internal configuration of an image scanning apparatus in an illustrative embodiment according to one or more aspects of the present disclosure.

In an illustrative embodiment according to aspects of the present disclosure, an image scanning apparatus 1 (see FIGS. 1 and 2) is configured as an automatic document feeder type image scanner. The image scanning apparatus 1 includes a document tray 10, a main body 3, and a discharge tray 15. Further, the image scanning apparatus 1 includes an operation I/F ("I/F" is an abbreviation of "interface") 95 and a display 95, which are disposed on an upper surface of the main body 3. The operation I/F 96 includes operable members such as a power switch and setting buttons. The operation I/F 96 is configured to accept instructions according to user operations of the operable members. The display 95 includes an LCD ("LCD" is an abbreviation of "Liquid Crystal Display"). The display 95 is configured to display a status of the image scanning apparatus 1. The document tray 10 has a front sensor FS configured to detect a document sheet Q set on the document tray 10.

The image scanning apparatus 1 has a conveyance path 40 formed inside the main body 3. A document sheet Q placed on the document tray 10 is conveyed in a conveyance direction TD along the conveyance path 40, and discharged onto the discharge tray 15. A pickup roller 31, a separation pad 32, ultrasonic sensors UA, UB, UC, UD, and UE, a rear sensor RS, two upstream conveyance rollers 41 and 42, two line sensors 20, and two downstream conveyance rollers 45 and 46 are disposed along the conveyance path 40.

The pickup roller 31 is configured to feed a plurality of document sheets Q placed on the document tray 10 on a sheet-by-sheet basis, in cooperation with the separation pad 32. The ultrasonic sensor UA is configured to detect multi-feed of document sheets. Each of the ultrasonic sensors UB, UC, UD, and UE is configured to detect a corresponding side end of a document sheet Q in a main scanning direction MD depending on a size of the document sheet Q, in accordance with below-mentioned processes. The rear sensor RS is configured to output an ON signal when there is a document sheet Q positioned at the upstream conveyance roller 41 and output an OFF signal when there is no document sheet Q positioned at the upstream conveyance roller 41. The upstream conveyance roller 41, the downstream conveyance roller 45, and the pickup roller 31 are driven by a conveyance motor (see FIG. 3) via a transmission mechanism 52 (see FIG. 3). The conveyance rollers 41, 42, 45, and 46 are configured to convey a document sheet Q fed by the pickup roller 31, to pass between the two line sensors 20. It is noted that, in the illustrative embodiment, the side ends of a document sheet Q are sides of the document sheet Q that are parallel to the conveyance direction TD.

In the illustrative embodiment, the image scanning apparatus 1 has the two line sensors 20 that are disposed to face each other across the conveyance path 40 and positioned between the upstream conveyance rollers 41 and 42 and the downstream conveyance rollers 45 and 46 in the conveyance direction TD. Thereby, the image scanning apparatus 1 is enabled to scan both surfaces of a document sheet Q. For instance, each of the line sensors 20 may include a contact image sensor.

Figure 2:
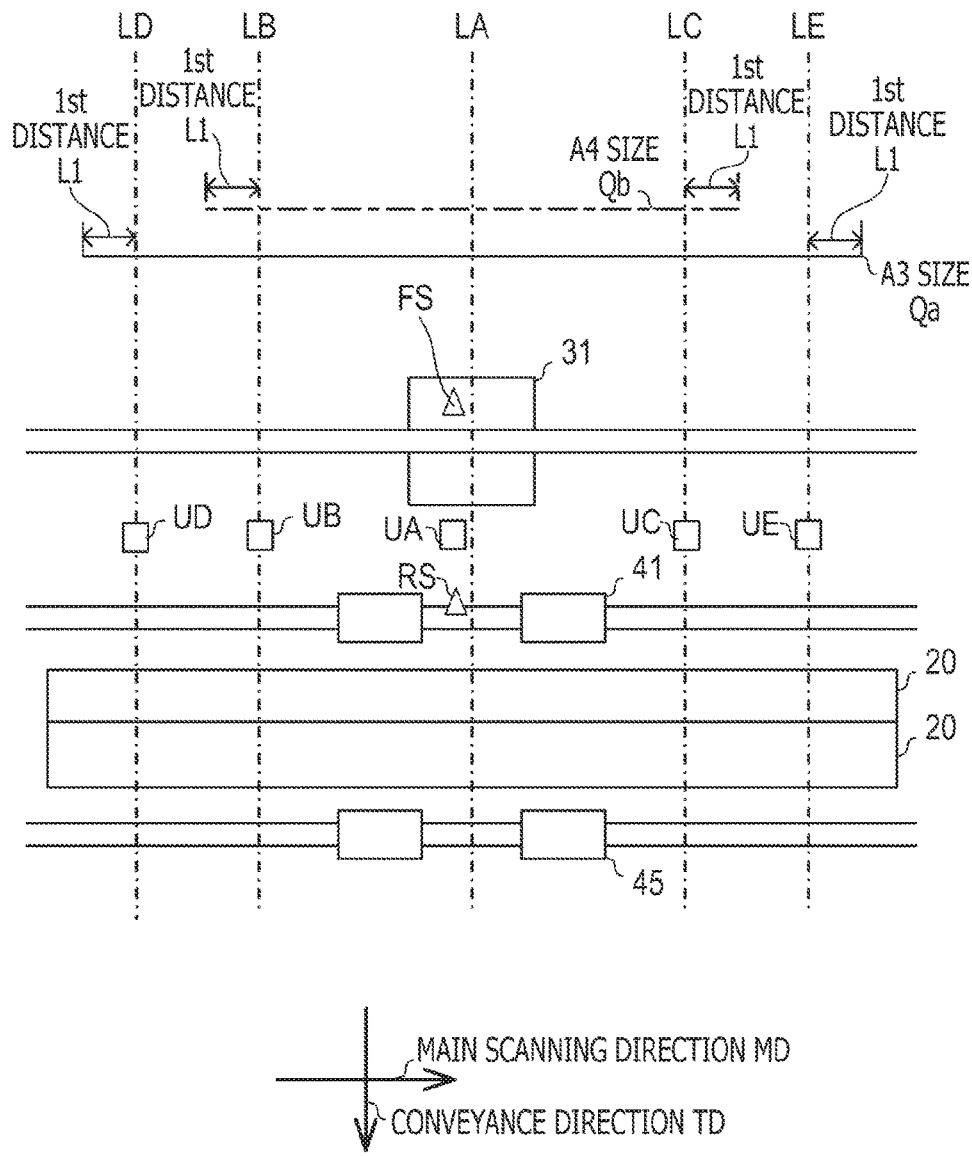
FIG. 2 is a plane view schematically showing a layout of elements such as various rollers and sensors disposed along a conveyance path in the image scanning apparatus, in the illustrative embodiment according to one or more aspects of the present disclosure.

A layout of the ultrasonic sensors UA, UB, UC, UD, and UE will be described with reference to FIG. 2. In FIG. 2, the main scanning direction MD and the conveyance direction TD are indicated by respective arrows. In the illustrative embodiment, the document tray 10 is configured as a center registration type document tray. Namely, the document tray 10 is configured such that a user may set thereon a plurality of same-size document sheets of which respective centers in the main scanning direction MD are positionally coincident with a center line LA. Hereinafter, A3-size document sheets Q having a width of 297 mm in the main scanning direction MD may be referred to as "document sheets Qa." Further, A4-size document sheets Q having a width of 210 mm in the main scanning direction MD may be referred to as "document sheets Qb."

As shown in FIG. 2, the ultrasonic sensors UA, UB, UC, UD, and UE are disposed between the pickup roller 31 and the upstream conveyance roller 41 in the conveyance direction TD. As described above, the ultrasonic sensor UA is configured to detect multi-feed of document sheets Q. Further, each of the ultrasonic sensors UB, UC, UD, and UE is configured to detect a distance from a center of an area where a corresponding one of the ultrasonic sensors is disposed to a side end of a document sheet Q. Specifically, the image scanning apparatus 1 has the ultrasonic sensors UA, UB, UC, UD, and UE in a middle point between the pickup roller 31 and the upstream conveyance roller 41 in the conveyance direction TD. The ultrasonic sensor UA is disposed near the center line LA of the conveyance path 40. In a state where an A4-size document sheet Qb is placed on the document tray 10, an auxiliary line LB is located a first distance L1 away, downstream in the main scanning direction MD, from an upstream side end of the document sheet Qb in the main scanning direction MD. The ultrasonic sensor UB is disposed on the auxiliary line LB. In the state where the A4-size document sheet Qb is placed on the document tray 10, an auxiliary line LC is located the first distance L1 away, upstream in the main scanning direction MD, from a downstream side end of the document sheet Qb in the main scanning direction MD. The ultrasonic sensor UC is disposed on the auxiliary line LC. In a state where an A3-size document sheet Qa is placed on the document tray 10, an auxiliary line LD is located the first distance L1 away, downstream in the main scanning direction MD, from an upstream side end of the document sheet Qa in the main scanning direction MD. The ultrasonic sensor UD is disposed on the auxiliary line LD. In the state where the A3-size document sheet Qa is placed on the document tray 10, an auxiliary line LE is located the first distance L1 away, upstream in the main scanning direction MD, from a downstream side end of the document sheet Qa in the main scanning direction MD. The ultrasonic sensor UE is disposed on the auxiliary line LE. In the illustrative embodiment, the first distance L1 may be 18 mm.

Referring to FIGS. 10B and 10C, detectable ranges for the ultrasonic sensor UB to detect a left side end of a document sheet Qb will be described. It is noted that, for instance, the left side end of the document sheet Qb may be a left-hand side end thereof in a plane view (e.g., FIGS. 2 and 10A-10C) of the image scanning apparatus 1. In FIG. 10B, a dashed line indicates a first range SP1 within which, when detecting the left side end of the document sheet Qb, the ultrasonic sensor UB outputs a detection signal having a value equal to or more than a first threshold TH1. The first range SP1 is defined as an area within a radius CR1 from a center position of the ultrasonic sensor UB. In FIG. 10B, an alternate long and short dash line indicates a second range SP2 within which, when detecting the left side end of the document sheet Qb, the ultrasonic sensor UB outputs a detection signal having a value equal to or more than a second threshold TH2. The second range SP2 is defined as an area within a radius CR2 from the center position of the ultrasonic sensor UB. In FIG. 10C, an alternate long and two short dashes line indicates a third range SP3 within which, when detecting the left side end of the document sheet Qb, the ultrasonic sensor UB outputs a detection signal having a value equal to or more than a third threshold TH3. The third range SP3 is defined as an area within a radius CR3 from the center position of the ultrasonic sensor UB. In the illustrative embodiment, the radius CR1 may be 15 mm. The radius CR2 may be 10 mm. The radius CR3 may be 5 mm. Hereinabove, the detectable ranges of the ultrasonic sensor UB have been described. Likewise, the first range SP1, the second range SP2, and the third range SP3 may be defined as detectable ranges for each of the ultrasonic sensors UC, UD, and UE. Namely, with respect to each of the ultrasonic sensors UC, UD, and UE, the first range SP1 may a range within which, when detecting a corresponding side end of a document sheet Q, each ultrasonic sensor outputs a detection signal having a value equal to or more than the first threshold TH1. Further, the second range SP2 may be a range within which, when detecting the corresponding side end of the document sheet Q, each ultrasonic sensor outputs a detection signal having a value equal to or more than the second threshold TH2. Furthermore, the third range SP3 may be a range within which, when detecting the corresponding side end of the document sheet Q, each ultrasonic sensor outputs a detection signal having a value equal to or more than the third threshold TH3. In the illustrative embodiment, the first threshold TH1, the second threshold TH2, and the third threshold TH3 may be individually set to provide the aforementioned detection results, prior to factory shipment of the image scanning apparatus 1.

<Electrical Configuration of Image Scanning Apparatus>

Figure 3:
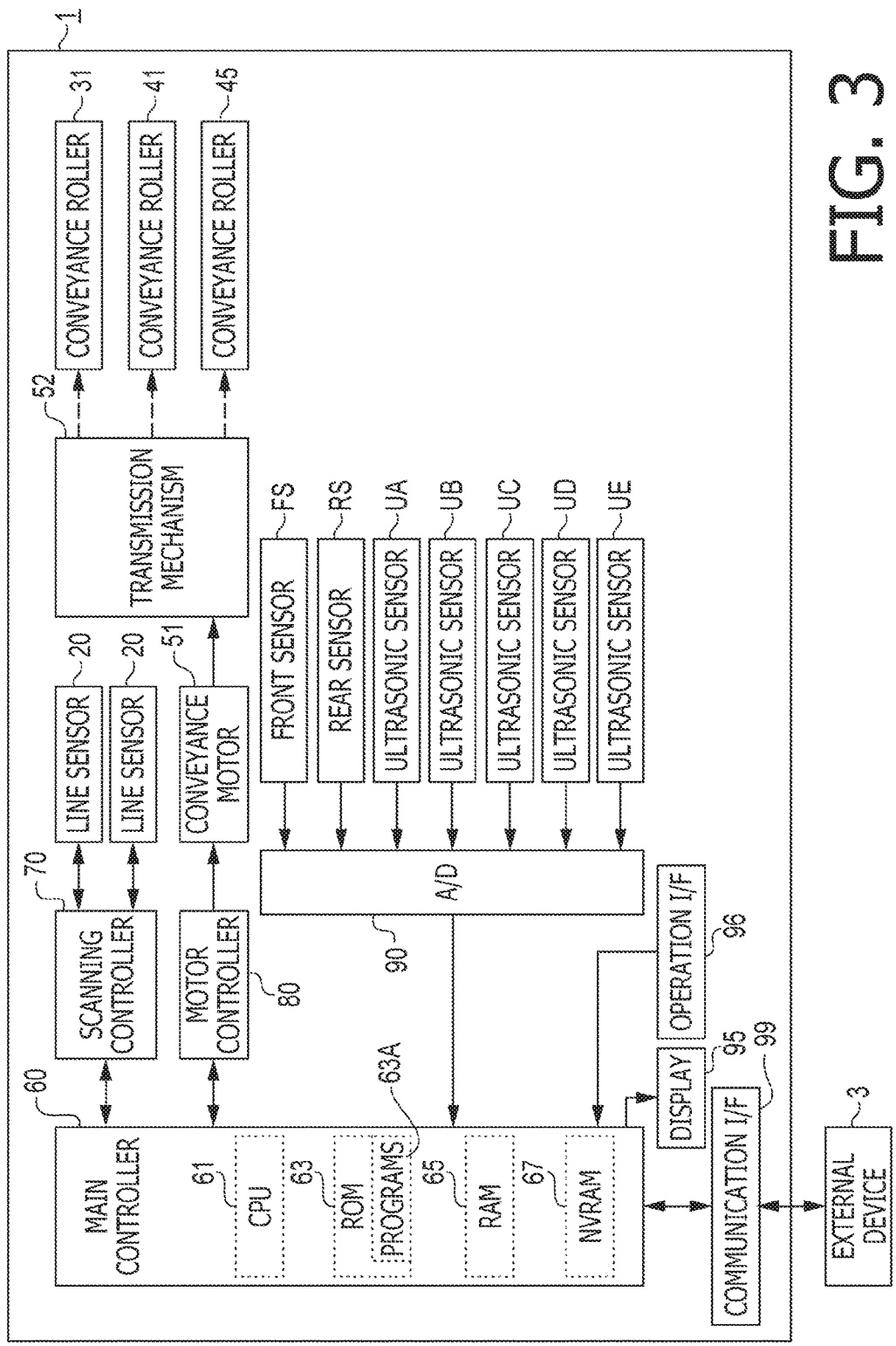
FIG. 3 is a block diagram schematically showing an electrical configuration of the image scanning apparatus in the illustrative embodiment according to one or more aspects of the present disclosure.

An electrical configuration of the image scanning apparatus 1 will be described with reference to FIG. 3. As shown in FIG. 3, the image scanning apparatus 1 includes a main controller 60, a scanning controller 70, a motor controller 80, an AD converter 90, the operation I/F 96, the display 95, and a communication I/F 99.

The main controller 60 is configured to take overall control of the image scanning apparatus 1. The main controller 60 includes a CPU 61, a ROM 63, a RAM 65, and an NVRAM 67. The CPU 61 is configured to perform processes in accordance with programs 63A stored in the ROM 63. The RAM 65 is usable as a work area during processes by the CPU 61. The NVRAM 67 is an electrically-rewritable and non-volatile memory configured to store various kinds of data. The main controller 60 takes overall control of the image scanning apparatus 1 by the CPU 61 executing various processes. Below-mentioned flags are stored in the RAM 65.

Fir instance, the main controller 60 may communicate with an external device 3 via the communication I/F 99. When receiving a scanning instruction in response to the start button of the operation I/F 96 being pressed, as will be described later, the main controller 60 controls the scanning controller 70 and the motor controller 80 to perform image scanning of a document sheet Q based on the scanning instruction. Afterwards, the main controller 60 transmits scanned image data (which represents a scanned image of the document sheet Q) generated by the image scanning of the document to the external device 3 via the communication I/F 99. For instance, the external device 3 may be a personal computer.

The scanning controller 70 drives and controls the line sensors 20 to perform image scanning of the document sheet Q along with conveyance of the document sheet Q, based on instructions from the main controller 60. The scanning controller 70 sequentially transmits, to the main controller 60, individual line data generated each time each line sensor 20 scans a single line of the image of the document sheet Q. In a below-mentioned main scanning process, the main controller 60 combines a plurality of pieces of line data received from the scanning controller 70 thereby generating the scanned image data representing the scanned image of the document sheet Q. After the main scanning process, the main controller 60 transmits the scanned image data to the external device 3.

The motor controller 80 drives and controls the conveyance motor 51 based on instructions from the main controller 60, thereby performing conveyance control for conveying the document sheet Q from the document tray 10 to the discharge tray 15. For instance, the conveyance motor 51 may be a stepping motor. In this case, the motor controller 80 may control a rotation amount of the conveyance motor 51, thereby controlling a conveyance amount of the document sheet Q.

The AD converter 90 is configured to convert, into digital values, output values from the front sensor FS, the rear sensor RS, and the ultrasonic sensors UA, UB, UC, UD, and UE, and transmit the digital values to the main controller 60. The operation I/F 96 is configured to accept a user operation and transmit a signal corresponding to the accepted user operation to the main controller 60. The display 95 is configured to receive signals from the main controller 60 and display the status of the image scanning apparatus 1.

<Operations by Image Scanning Apparatus>

(Main Scanning Process)

Subsequently, operations by the image scanning apparatus 1 will be described with reference to relevant drawings. The image scanning apparatus 1 performs the main scanning process to scan an image of a document sheet Q. Processes R1 to R10 of the main scanning process show in FIG. 4 are performed by the main controller 60.

Figure 4:
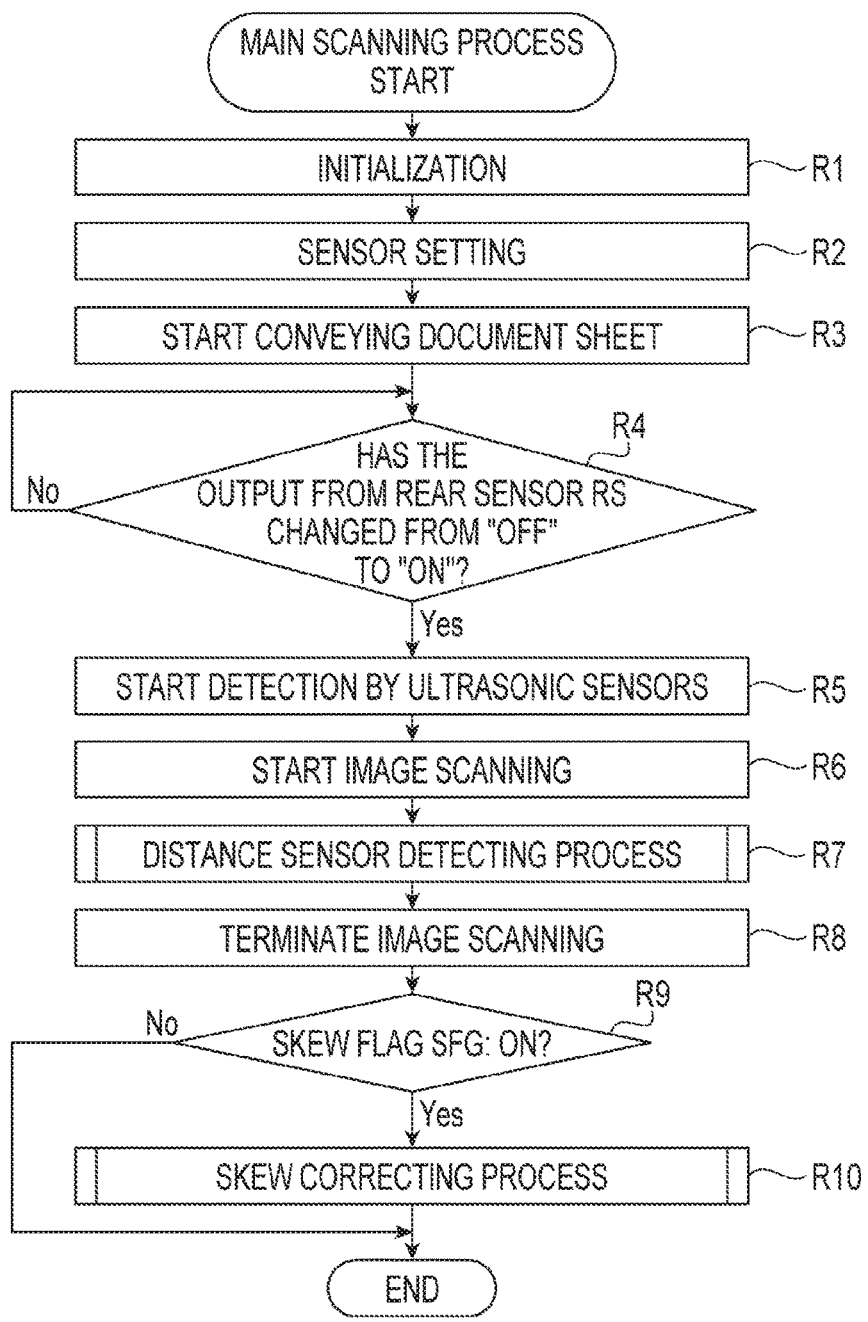
FIG. 4 is a flowchart showing a procedure of a main scanning process in the illustrative embodiment according to one or more aspects of the present disclosure.

The main scanning process shown in FIG. 4 is started in response to the user setting the document sheet Q on the document tray 10, inputting a document size of the document sheet Q via the operation I/F 96, and pressing the start button of the operation I/F 96. Namely, when receiving a scanning instruction in response to the start button of the operation I/F 96 being pressed in a state where the front sensor FS is outputting the ON signal, the main controller 60 starts the main scanning process. The main controller 60 stores, into the RAM 65, the document size of the document sheet Q input before receipt of the scanning instruction.

The main controller 60 initializes the scanning controller 70 and the motor controller 80 (R1). Specifically, the main controller 60 sets setting values necessary for image scanning of the document sheet Q, for the scanning controller 70 and the motor controller 80.

The main controller 60 sets the ultrasonic sensors UB, UC, UD, and UE (R2). Specifically, the main controller 60 acquires the document size of the document sheet Q stored in the RAM 65. When the document sheet Q is an A3-size document sheet Qa, the main controller 60 sets the ultrasonic sensor UD as a left distance sensor LL, and sets the ultrasonic sensor UE as a right distance sensor RL. When the document sheet Q is an A4-size document sheet Qb, the main controller 60 sets the ultrasonic sensor UB as the left distance sensor LL, and sets the ultrasonic sensor UC as the right distance sensor RL. In the illustrative embodiment, "A3" (i.e., the A3-size document sheet Qa) or "A4" (i.e., the A4-size document sheet Qb) may be input as the document size of the document sheet Q.

The main controller 60 transmits, to the motor controller 80, an instruction to drive the conveyance motor 51, thereby beginning to convey the document sheet Q in the conveyance direction TD (R3).

The main controller 60 determines whether the output signal from the rear sensor RS has changed from the OFF signal to the ON signal (R4). When determining that the output signal from the rear sensor RS has changed from the OFF signal to the ON signal (R4: Yes), the main controller 60 goes to R5. Meanwhile, when determining that the output signal from the rear sensor RS has not changed from the OFF signal to the ON signal (R4: No), the main controller 60 continues to convey the document sheet Q in the conveyance direction TD.

The main controller 60 starts detecting operations with the ultrasonic sensors UA, UB, UC, UD, and UE (R5). Specifically, the main controller 60 starts a detecting operation with an ultrasonic sensor set as the right distance sensor RL, starts a detecting operation with an ultrasonic sensor set as the left distance sensor LL, and starts a detecting operation with the ultrasonic sensor UA. As described above, the ultrasonic sensor UA is configured to detect multi-feed of document sheets Q. In the illustrative embodiment, a detection time interval for each ultrasonic sensor may be 5 msec.

The main controller 60 starts image scanning (R6). Specifically, the main controller 60 transmits an instruction to start image scanning to the scanning controller 70, thereby starting a scanning operation to generate scanned image data when the document sheet Q is conveyed to a position where the leading end of the document sheet Q faces the line sensors 20. The scanned image data is stored into the RAM 65.

The main controller 60 performs a distance sensor detecting process (R7). Since the distance sensor detecting process will be described in detail later, a general outline thereof is provided here. According to detection results of the right distance sensor RL and the left distance sensor LL, the main controller 60 stores, into the RAM 65, a skew flag SFG, a rotation flag RFG, a rotational skew flag RSFG, and a skew angle SA.

The main controller 60 terminates the image scanning (R8). Specifically, the main controller 60 transmits an instruction to the scanning controller 70, thereby terminating the scanning operation when the document sheet Q is conveyed to a position where a trailing end of the document sheet Q faces the line sensors 20, and conveying the document sheet Q onto the discharge tray 15.

The main controller 60 determines whether the skew flag SFG is "ON" (R9). When determining that the skew flag SFG is "ON" (R9: Yes), the main controller 60 goes to a process R10. Meanwhile, when determining that the skew flag SFG is "OFF" (R9: No), the main controller 60 terminates the main scanning process.

The main controller 60 performs a skew correcting process (R10). Since the skew correcting process will be described in detail later, a general outline thereof is provided here. The main controller 60 corrects the scanned image data stored in the RAM 65, based on the rotation flag RFG, the rotational skew flag RSFG, and the skew angle SA stored in the process R7. After completion of the process R10, the main controller 60 terminates the main scanning process shown in FIG. 4.

(Distance Sensor Detecting Process)

Figure 5:
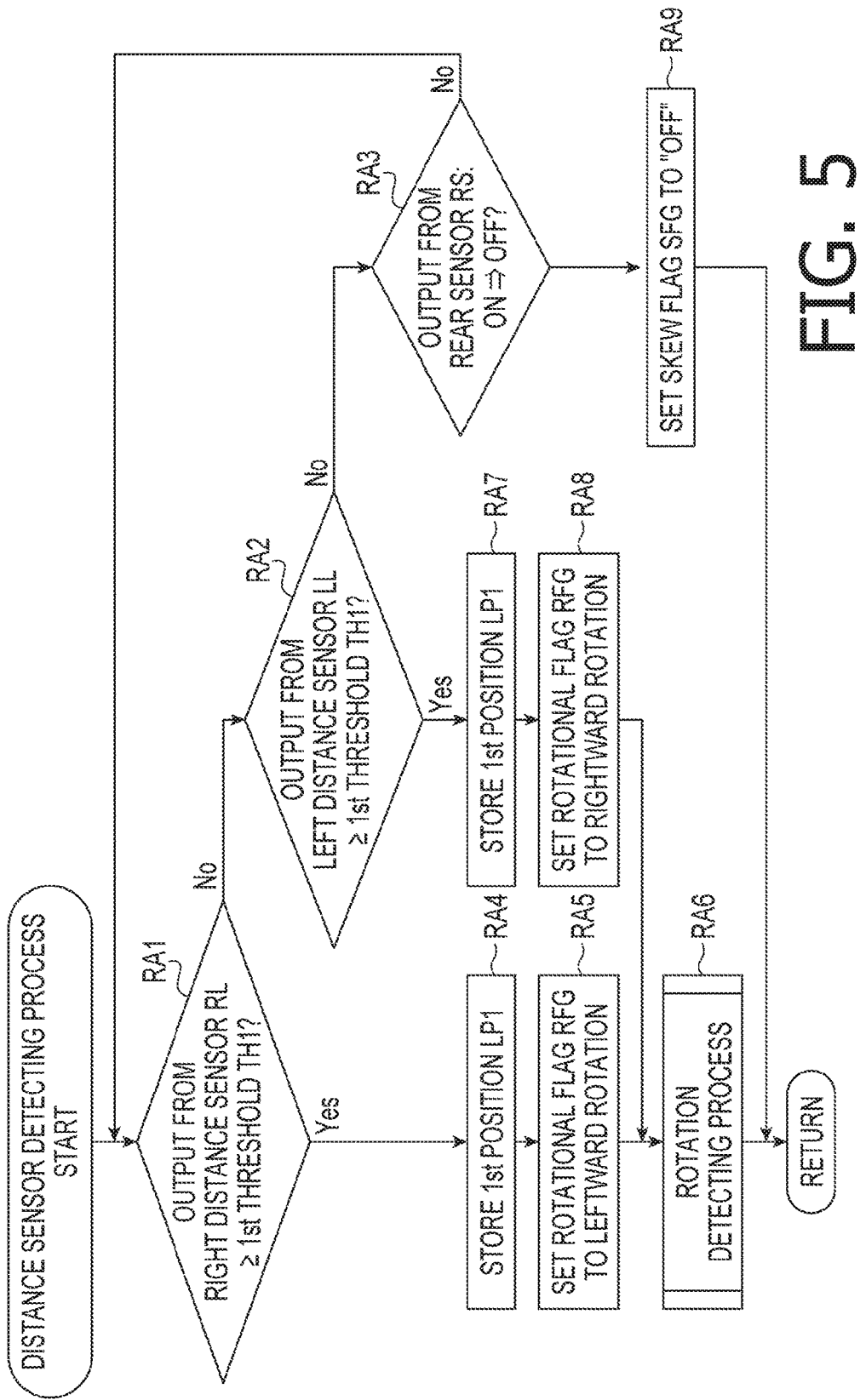
FIG. 5 is a flowchart showing a procedure of a distance sensor detecting process in the illustrative embodiment according to one or more aspects of the present disclosure.

When the distance sensor detecting process R7 (see FIG. 5) is started, the main controller 60 determines whether the value of the output signal from the right distance sensor RL is equal to or more than the first threshold TH1 (RA1). When determining that the value of the output signal from the right distance sensor RL is equal to or more than the first threshold TH1 (RA1: Yes), the main controller 60 goes to a process RA4. Meanwhile, when determining that the value of the output signal from the right distance sensor RL is less than the first threshold TH1 (RA1: No), the main controller 60 goes to a process RA2.

The main controller 60 determines whether the value of the output signal from the left distance sensor LL is equal to or more than the first threshold TH1 (RA2). When determining that the value of the output signal from the left distance sensor LL is equal to or more than the first threshold TH1 (RA2: Yes), the main controller 60 goes to a process RA7. Meanwhile, when determining that the value of the output signal from the left distance sensor LL is less than the first threshold TH1 (RA2: No), the main controller 60 goes to a process RA3.

The main controller 60 determines whether the output signal from the rear sensor RS has changed from the ON signal to the OFF signal (RA3). When determining that the output signal from the rear sensor RS has not changed from the ON signal to the OFF signal (RA3: No), the main controller 60 goes back to the process RA1. Meanwhile, when determining that the output signal from the rear sensor RS has changed from the ON signal to the OFF signal (RA3: Yes), the main controller 60 goes back to a process RA9. In the illustrative embodiment, when the output signal from the rear sensor RS changes from the ON signal to the OFF signal, the trailing end of the document sheet Q in the conveyance direction TD may pass by the upstream conveyance roller 41. The scanning operation in the process R8 is terminated using the timing at which the output signal from the rear sensor RS changes from the ON signal to the OFF signal. The same may apply to processes RB6 and RC3.

When determining that the value of the output signal from the right distance sensor RL is equal to or more than the first threshold TH1 (RA1: Yes), the main controller 60 stores a first position LP1 into the RAM 65 (RA4). Specifically, the main controller 60 controls the RAM 65 to store, as the first position LP1, a conveyance distance of the document sheet Q from an initial position of the document sheet Q placed on the document tray 10 to a position of the document sheet Q at a point of time when the main controller 60 has made the affirmative determination in the process RA1 (RA1: Yes). In the illustrative embodiment, the first position LP1 may be expressed as the number of steps of the conveyance motor 51.

The main controller 60 sets, for the rotation flag RFG, a setting value representing leftward rotation (RA5). It is noted that, for instance, the "leftward rotation" may be "counterclockwise rotation" in a plane view (e.g., FIGS. 2 and 10A-10C) of the image scanning apparatus 1.

The main controller 60 performs a rotation detecting process (RA6). Since the rotation detecting process will be described in detail later, a general outline thereof is provided here. The main controller 60 stores the skew flag SFG, the rotational skew flag RSFG, and the skew angle SA into the RAM 65. After completion of the process RA6, the main controller 60 terminates the distance sensor detecting process R7 (see FIG. 5) and returns to the main scanning process (see FIG. 4).

When determining that the value of the output signal from the left distance sensor LL is equal to or more than the first threshold TH1 (RA2: Yes), the main controller 60 stores the first position LP1 into the RAM 65 (RA7). Specifically, the main controller 60 stores, into the RAM 65, a conveyance distance of the document sheet Q from the initial position of the document sheet Q placed on the document tray 10 to a position of the document sheet Q at a point of time when the main controller 60 has made the affirmative determination in the process RA2 (RA2: Yes), as the first position LP1.

The main controller 60 sets, for the rotation flag RFG, a setting value representing rightward rotation (RA8). After completion of the process RA8, the main controller 60 goes to the process RA6. It is noted that, for instance, the "rightward rotation" may be "clockwise rotation" in a plane view (e.g., FIGS. 2 and 10A-10C) of the image scanning apparatus 1.

When determining that the output signal from the rear sensor RS has changed from the ON signal to the OFF signal (RA3: Yes), the main controller 60 sets the skew flag SFG to "OFF" (RA9). After completion of the process RA9, the main controller 60 terminates the distance sensor detecting process R7 (see FIG. 5) and returns to the main scanning process (see FIG. 4).

(Rotation Detecting Process)

When the rotation detecting process RA6 (see FIG. 6) is started, the main controller 60 determines whether the rotation flag RFG is the setting value representing leftward rotation (RB1). When determining that the rotation flag RFG is the setting value representing rightward rotation (RB1: No), the main controller 60 goes to a process RB3. Meanwhile, when determining that the rotation flag RFG is the setting value representing leftward rotation (RB1: Yes), the main controller 60 goes to a process RB2.

The main controller 60 sets the right distance sensor RL as a target sensor TL, and sets the left distance sensor LL as a non-target sensor NTL (RB2). After completion of the process RB2, the main controller 60 goes to a process RB4.

The main controller 60 sets the left distance sensor LL as the target sensor TL, and sets the right distance sensor RL as the non-target sensor NTL (RB3).

After completion of the process RB2 or the process RB3, the main controller 60 determines whether a value of an output signal from the target sensor TL is equal to or more than the second threshold TH2 (RB4). When determining that the value of the output signal from the target sensor TL is equal to or more than the second threshold TH2 (RB4: Yes), the main controller 60 goes to a process RB7. Meanwhile, when determining that the value of the output signal from the target sensor TL is less than the second threshold TH2 (RB4: No), the main controller 60 goes to a process RB5.

The main controller 60 determines whether a value of an output signal from the non-target sensor NTL is equal to or more than the first threshold TH1 (RB5). When determining that the value of the output signal from the non-target sensor NTL is equal to or more than the first threshold TH1 (RB5: Yes), the main controller 60 goes to a process RB11. Meanwhile, when determining that the value of the output signal from the non-target sensor NTL is less than the first threshold TH1 (RB5: No), the main controller 60 goes to a process RB6.

The main controller 60 determines whether the output signal from the rear sensor RS has changed from the ON signal to the OFF signal (RB6). When determining that the output signal from the rear sensor RS has changed from the ON signal to the OFF signal (RB6: Yes), the main controller 60 goes to a process RB11. Meanwhile, when determining that the output signal from the rear sensor RS has not changed from the ON signal to the OFF signal (RB6: No), the main controller 60 goes to the process RB4.

When determining that the value of the output signal from the target sensor TL is equal to or more than the second threshold TH2 (RB4: Yes), the main controller 60 stores a second position LP2 into the RAM 65 (RB7). Specifically, the main controller 60 controls the RAM 65 to store, as the second position LP2, a conveyance distance of the document sheet Q from the initial position of the document sheet Q placed on the document tray 10 to a position of the document sheet Q at a point of time when the main controller 60 has made the affirmative determination in the process RB4 (RB4: Yes). In the illustrative embodiment, the second position LP2 may be expressed as the number of steps of the conveyance motor 51.

Figure 9:
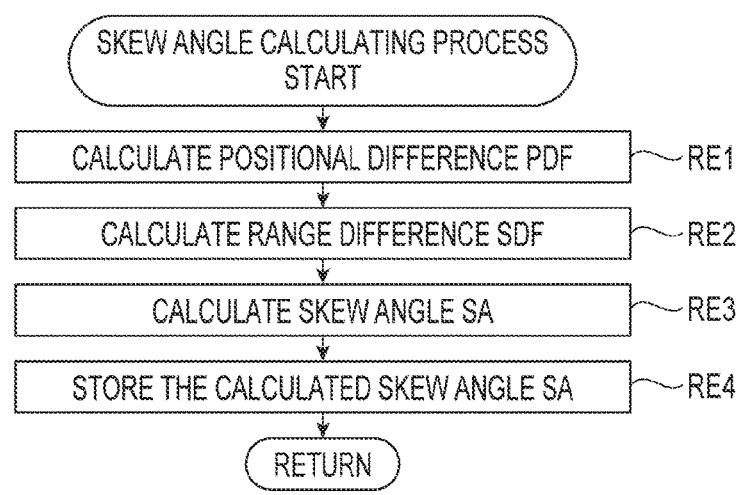
FIG. 9 is a flowchart showing a procedure of a skew angle detecting process in the illustrative embodiment according to one or more aspects of the present disclosure.

The main controller 60 performs a skew angle calculating process (see FIG. 9) to calculate the skew angle SA (RB8). Specifically, as shown in FIG. 9, the main controller 60 calculates a positional difference PDF by subtracting the first position LP1 from the second position LP2 (RE1). The main controller 60 calculates a range difference SDF by subtracting the radius CR2 of the second range SP2 from the radius CR1 of the first range SP1 (RE2). The main controller 60 determines the skew angle SA by calculating an arc sine of the range difference SDF divided by the positional difference PDF (RE3). The main controller 60 stores the skew angle SA into the RAM 65 (RE4). After completion of the process RE4, the main controller 60 terminates the skew angle calculating process RB8 (see FIG. 9) and returns to the rotation detecting process RA6 (more specifically, going to a process RB9 in FIG. 6).

Figure 6:
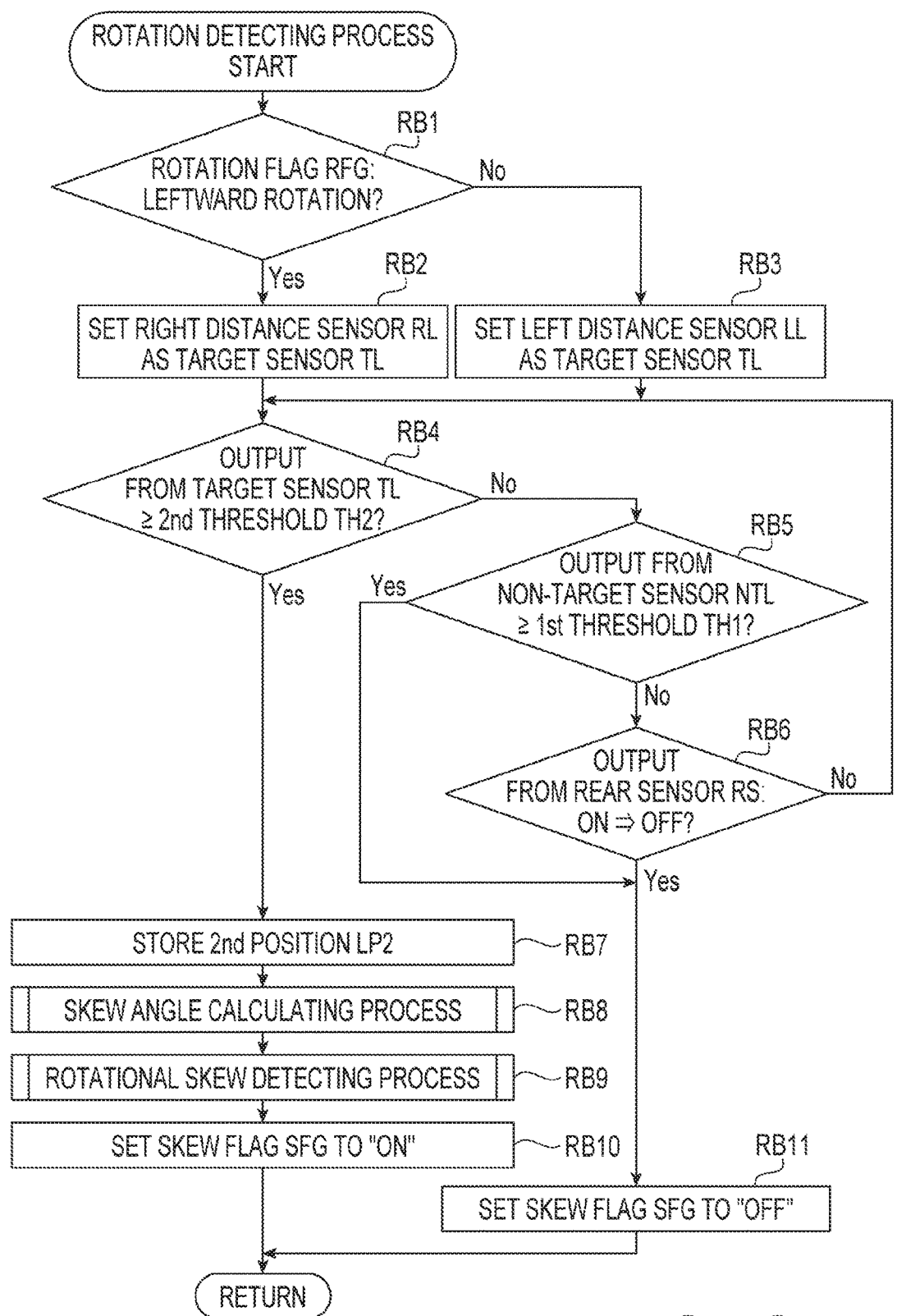
FIG. 6 is a flowchart showing a procedure of a rotation detecting process in the illustrative embodiment according to one or more aspects of the present disclosure.

As shown in FIG. 6, the main controller 60 performs a rotational skew detecting process (RB9). Since the rotational skew detecting process will be described in detail later, a general outline thereof is provided here. The main controller 60 stores the rotational skew flag RSFG into the RAM 65.

The main controller 60 sets the skew flag SFG to "ON" (RB10). After completion of the process RB10, the main controller 60 terminates the rotation detecting process RA6 (see FIG. 6).

When making the affirmative determination in the process RB5 (RB5: Yes) or making the affirmative determination in the process RB6 (RB6: Yes), the main controller 60 sets the skew flag SFG to "OFF" (RB11). After completion of the process RB11, the main controller 60 terminates the rotation detecting process RA6. In the illustrative embodiment, the affirmative determination in the process RB5 (RB5: Yes) denotes that the non-target sensor NTL, which is positioned on an opposite side of the target sensor TL having detected a side end of the document sheet Q in the main scanning direction, detects a side end of the document sheet Q. In this case, the main controller 60 determines that the document sheet Q is not formed in a rectangular shape, and sets the skew flag SFG to "OFF."

(Rotational Skew Detecting Process)

Figure 7:
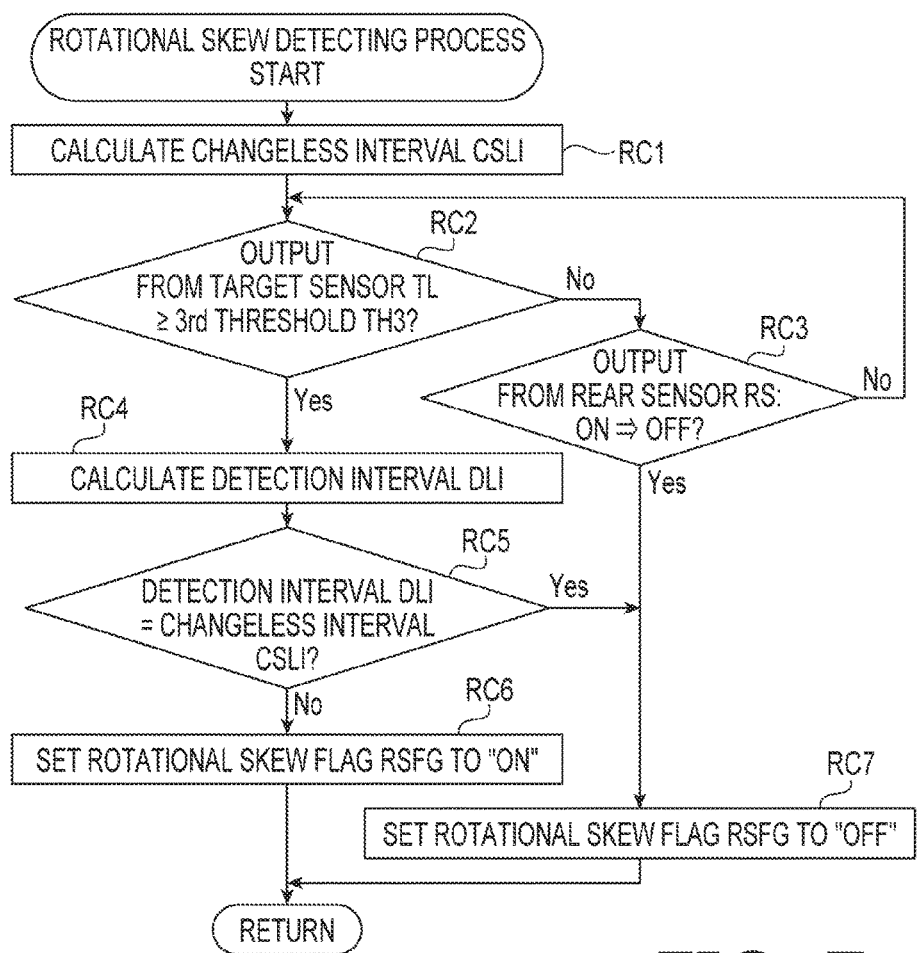
FIG. 7 is a flowchart showing a procedure of a rotational skew detecting process in the illustrative embodiment according to one or more aspects of the present disclosure.

When the rotational skew detecting process RB9 (see FIG. 7) is started, the main controller 60 calculates a changeless interval CSLI (RC1). Specifically, the main controller 60 calculates the changeless interval CSLI by subtracting the first position LP1 from the second position LP2. In the illustrative embodiment, a difference between the radius CR1 of the first range SP1 and the radius CR2 of the second range SP2 is equal to a difference between the radius CR2 of the second range SP2 and the radius CR3 of the third range SP3. Therefore, in the illustrative embodiment, when there is no change in the skew angle SA while the document sheet Q is conveyed, a distance between a position where the first position LP1 is detected and a position where the second position LP2 is detected is equal to a distance between the position where the second position LP2 is detected and a position where a third position LP3 is detected. It is noted that the third position LP3 may be a conveyance distance of the document sheet Q from the initial position of the document sheet Q placed on the document tray 10 to a position of the document sheet Q at a point of time when the main controller 60 has made the affirmative determination in the process RC2 (RC2: Yes). Thus, in other words, the changeless interval CSLI may be equivalent to a distance in the conveyance direction TD between the second position LP2 and the third position LP3 under an assumption that the skew angle SA of the document sheet Q being conveyed is not varying.

The main controller 60 determines whether the value of the output signal from the target sensor TL is equal to or more than the third threshold TH3 (RC2). When determining that the value of the output signal from the target sensor TL is equal to or more than the third threshold TH3 (RC2: Yes), the main controller 60 goes to a process RC4. Meanwhile, when determining that the value of the output signal from the target sensor TL is less than the third threshold TH3 (RC2: No), the main controller 60 goes to a process RC3.

The main controller 60 determines whether the output signal from the rear sensor RS has changed from the ON signal to the OFF signal (RC3). When determining that the output signal from the rear sensor RS has changed from the ON signal to the OFF signal (RC3: Yes), the main controller 60 goes to a process RC7. Meanwhile, when determining that the output signal from the rear sensor RS has not changed from the ON signal to the OFF signal (RC3: No), the main controller 60 goes back to the process RC2.

When determining that the value of the output signal from the target sensor TL is equal to or more than the third threshold TH3 (RC2: Yes), the main controller 60 calculates a detection interval DLI (RC4). Specifically, the main controller 60 calculates the detection interval DLI by subtracting the second position LP2 from the conveyance distance (i.e., the third position LP3) of the document sheet Q from the initial position of the document sheet Q placed on the document tray 10 to the position of the document sheet Q at the point of time when the main controller 60 has made the affirmative determination in the process RC2 (RC2: Yes). The main controller 60 stores the detection interval DLI into the RAM 65. In the illustrative embodiment, the conveyance distance (i.e., the third position LP3) of the document sheet Q from the initial position of the document sheet Q placed on the document tray 10 to the position of the document sheet Q at the point of time when the main controller 60 has made the affirmative determination in the process RC2 (RC2: Yes) may be expressed as the number of steps of the conveyance motor 51.

The main controller 60 determines whether the detection interval DLI is identical to the changeless interval CSLI (RC5). When determining that the detection interval DLI is not identical to the changeless interval CSLI (RC5: No), the main controller 60 goes to a process RC6. Meanwhile, when determining that the detection interval DLI is identical to the changeless interval CSLI (RC5: Yes), the main controller 60 goes to a process RC7.

The main controller 60 sets the rotational skew flag RSFG to "ON" (RC6). After completion of the process RC6, the main controller 60 terminates the rotational skew detecting process RB9. In the illustrative embodiment, when the rotational skew flag RSFG is "ON," it denotes that the document sheet Q is in a rotational skew state where the skew angle SA of the document sheet Q is varying.

When determining that the output signal from the rear sensor RS has changed from the ON signal to the OFF signal (RC3: Yes) or determining that the detection interval DLI is identical to the changeless interval CSLI (RC5: Yes), the main controller 60 sets the rotational skew flag RSFG to "OFF" (RC7). After completion of the process RC7, the main controller 60 terminates the rotational skew detecting process RB9 (see FIG. 7) and returns to the rotation detecting process RA6 (see FIG. 6).

(Skew Correcting Process)

Figure 8:
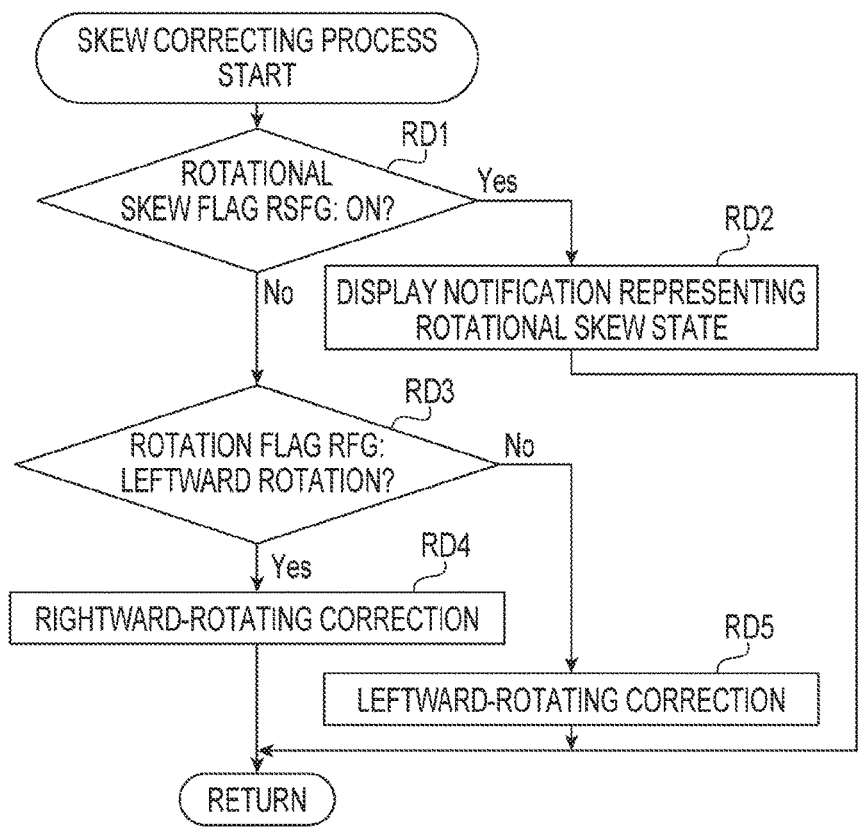
FIG. 8 is a flowchart showing a procedure of a skew correcting process in the illustrative embodiment according to one or more aspects of the present disclosure.

When the skew correcting process R10 (see FIG. 8) is started, the main controller 60 determines whether the rotational skew flag RSFG is "ON" (RD1). When determining that the rotational skew flag RSFG is "ON" (RD1: Yes), the main controller 60 goes to a process RD2. Meanwhile, when determining that the rotational skew flag RSFG is "OFF" (RD1: No), the main controller 60 goes to a process RD3.

The main controller 60 controls the display 95 to display a notification that the document sheet Q is in the rotational skew state where the skew angle SA of the document sheet Q is varying (RD2). When a scanned image is acquired by image scanning in the rotational skew state, the notification that the document sheet Q is in the rotational skew state is displayed on the display 95. Therefore, the user is allowed to reattempt to perform image scanning of the document sheet Q as needed.

When determining that the rotational skew flag RSFG is "OFF" (RD1: No), the main controller 60 determines whether the rotation flag RFG is the setting value representing leftward rotation (RD3). When determining that the rotation flag RFG is the setting value representing rightward rotation (RD3: No), the main controller 60 goes to a process RD5. Meanwhile, when determining that the rotation flag RFG is the setting value representing leftward rotation (RD3: Yes), the main controller 60 goes to a process RD4.

The main controller 60 makes a correction to rotate the scanned image data rightward (RD4). Specifically, the main controller 60 corrects the scanned image data stored in the RAM 65 by rotating the scanned image data rightward by the skew angle SA, and stores the corrected image data into the RAM 65. After completion of the process RD4, the main controller 60 terminates the skew correcting process R10 (see FIG. 8).

The main controller 60 makes a correction to rotate the scanned image data leftward (RD5). Specifically, the main controller 60 corrects the scanned image data stored in the RAM 65 by rotating the scanned image data leftward by the skew angle SA, and stores the corrected image data into the RAM 65. After completion of the process RD5, the main controller 60 terminates the skew correcting process R10 (see FIG. 8).

Specific Example

A conveyance state of an A4-size document sheet Qb when the left distance sensor LL detects the A4-size document sheet Qb will be described with reference to FIGS. 10A, 10B, and 10C. First, referring to FIG. 10A, an explanation will be provided of a conveyance state of the A4-size document sheet Qb when the value of the output signal from the left distance sensor LL is equal to or more than the first threshold TH1 (RA2: Yes). In FIG. 10A, when the A4-size document sheet Qb is placed on the document tray 10, the ultrasonic sensor UB is set as the left distance sensor LL. When a left side end of the document sheet Qb is brought within the first range SP1 of the left distance sensor LL, the main controller 60 determines that the value of the output signal from the left distance sensor LL is equal to or more than the first threshold TH1 (RA2: Yes). The left distance sensor LL is disposed 18 mm away, downstream in the main scanning direction MD, from the left side end of the document sheet Qb placed on the document tray 10. Therefore, in this case, the left side end of the document sheet Qb is brought within the radius CR1 (i.e., 15 mm) of the first range SP1 from the center position of the left distance sensor LL. Hence, when the main controller 60 makes the affirmative determination in the process RA2 (RA2: Yes), the document sheet Qb is in a conveyance state where the left side end thereof (more specifically, a closest position of the left side end thereof to the center of the left distance sensor LL) is shifted by about 3 mm inward in the main scanning direction MD from a position of the left side end of the document sheet Qb placed on the document tray 10.

A conveyance state of the A4-size document sheet Qb when the value of the output signal from the target sensor TL is equal to or more than the second threshold TH2 (RB4: Yes) will be described with reference to FIG. 10B. In FIG. 10B, when the A4-size document sheet Qb is placed on the document tray 10, the ultrasonic sensor UB is set as the left distance sensor LL. When the left side end of the document sheet Qb is brought within the second range SP2 of the left distance sensor LL, the main controller 60 determines that the value of the output signal from the left distance sensor LL is equal to or more than the second threshold TH2 (RB4: Yes). The left distance sensor LL is disposed 18 mm away, downstream in the main scanning direction MD, from the left side end of the document sheet Qb placed on the document tray 10. Therefore, in this case, the left side end of the document sheet Qb is brought within the radius CR2 (i.e., 10 mm) of the second range SP2 from the center position of the left distance sensor LL. Hence, when the main controller 60 makes the affirmative determination in the process RB4 (RB4: Yes), the document sheet Qb is in a conveyance state where the left side end thereof (more specifically, the closest position of the left side end thereof to the center of the left distance sensor LL) is shifted by about 8 mm inward in the main scanning direction MD from the position of the left side end of the document sheet Qb placed on the document tray 10.

A method for calculating the skew angle SA will be described with reference to FIG. 10B. As shown in FIG. 10B, a distance in the conveyance direction TD between a position of the document sheet Qb when the left distance sensor LL outputs a detection signal having a value equal to the first threshold TH1 and a position of the document sheet Qb when the left distance sensor LL outputs a detection signal having a value equal to the second threshold TH2 is the positional difference PDF. The positional difference PDF is obtained by subtracting the first position LP1 from the second position LP2. A distance between a position of the left side end of the document sheet Qb when the left distance sensor LL outputs the detection signal having the value equal to the first threshold TH1 and a position of the left side end of the document sheet Qb when the left distance sensor LL outputs the detection signal having the value equal to the second threshold TH2 is the range difference SDF. The range difference SDF is obtained by subtracting the radius CR2 of the second range SP2 from the radius CR1 of the first range SP1. Hence, the skew angle SA is calculated by converting, via arc sine calculation, the range difference SDF divided by the positional difference PDF.

A conveyance state of the A4-size document sheet Qb when the value of the output signal from the target sensor TL is equal to or more than the third threshold TH3 (RC2: Yes) will be described with reference to FIG. 10C. In FIG. 10C, when the A4-size document sheet Qb is placed on the document tray 10, the ultrasonic sensor UB is set as the left distance sensor LL. When the left side end of the document sheet Qb is brought within the third range SP3 of the left distance sensor LL, the main controller 60 determines that the value of the output signal from the target sensor TL is equal to or more than the third threshold TH3 (RC2: Yes). The left distance sensor LL is disposed 18 mm away, downstream in the main scanning direction MD, from the left side end of the document sheet Qb placed on the document tray 10. Therefore, in this case, the left side end of the document sheet Qb is brought within the radius CR3 (i.e., 5 mm) of the third range SP3 from the center position of the left distance sensor LL. Hence, when the main controller 60 makes the affirmative determination in the process RC2 (RC2: Yes), the document sheet Qb is in a conveyance state where the left side end thereof (more specifically, the closest position of the left side end thereof to the center of the left distance sensor LL) is shifted by about 13 mm inward in the main scanning direction MD from the position of the left side end of the document sheet Qb placed on the document tray 10.

Advantageous Effects of Illustrative Embodiments

In the illustrative embodiment, in the distance sensor detecting process R7, when the value of the output signal from the right distance sensor RL is equal to or more than the first threshold TH1 (RA1: Yes), the first position LP1 is stored into the RAM 65 (RA4). When the value of the output signal from the left distance sensor LL is equal to or more than the first threshold TH1 (RA2: Yes), the first position LP1 is stored into the RAM 65 (RA7). When the value of the output signal from the target sensor TL is equal to or more than the second threshold TH2 (RB4: Yes), the second position LP2 is stored into the RAM 65 (RB7). In the process RB8, the positional difference PDF is calculated by subtracting the first position LP1 from the second position LP2. Further, the range difference SDF is calculated by subtracting the radius CR2 of the second range SP2 from the radius CR1 of the first range SP1. Moreover, the skew angle SA is determined by calculating the arc sine of the range difference SDF divided by the positional difference PDF. In the process RD4 or the process RD5, the scanned image data is corrected to be rotated by the skew angle SA. Then the corrected image data is stored into the RAM 65. Thus, the skew angle SA is calculated based on the first position LP1 stored when the value of the output signal from the left distance sensor LL is equal to or more than the first threshold TH1 and the second position LP2 stored when the value of the output signal from the left distance sensor LL is equal to or more than the second threshold TH2. Further, the scanned image data is corrected to be rotated by the skew angle SA. Thereby, the image scanning apparatus 1 may detect a skewed state of the document sheet Q being conveyed and correct the scanned image data based on the detected skewed state.

When the value of the output signal from the right distance sensor RL is equal to or more than the first threshold TH1 (RA1: Yes), the setting value representing leftward rotation is set for the rotation flag RFG (RA5). When the value of the output signal from the left distance sensor LL is equal to or more than the first threshold TH1 (RA2: Yes), the setting value representing rightward rotation is set for the rotation flag RFG (RA8). In the process RD4, the scanned image data is corrected to be rotated rightward by the skew angle SA. Further, the corrected image data is stored into the RAM 65. In the process RD5, the scanned image data is corrected to be rotated leftward by the skew angle SA. Further, the corrected image data is stored into the RAM 65. Thus, the image scanning apparatus 1 may detect the rotational direction of the document sheet Q being conveyed with the skew angle SA, and may correct the scanned image data by rotating the scanned image data in an appropriate rotational direction.

In the process RC1, the changeless interval CSLI is calculated by subtracting the first position LP1 from the second position LP2. When the value of the output signal from the target sensor TL is equal to or more than the third threshold TH3 (RC2: Yes), the detection interval DLI is calculated by subtracting the second position LP2 from the conveyance distance of the document sheet Q from the initial position of the document sheet Q placed on the document tray 10 to the position of the document sheet Q at the point of time when the main controller 60 has made the affirmative determination in the process RC2. In the process RC5, it is determined whether the detection interval DLI is identical to the changeless interval CSLI. When the detection interval DLI is not identical to the changeless interval CSLI (RC5: No), the rotational skew flag RSFG is set to "ON" (RC6). When the detection interval DLI is identical to the changeless interval CSLI (RC5: Yes), the rotational skew flag RSFG is set to "OFF" (RC6). When the rotational skew flag RSFG is "ON" (RD1: Yes), the notification representing the rotational skew state where the skew angle SA of the document sheet Q is varying is displayed on the display 95 (RD2). When the rotational skew flag RSFG is "OFF" (RD1: No), in the process RD4 or the process RD5, the scanned image data is corrected to be rotated by the skew angle SA, and the corrected image data is stored into the RAM 65. Thus, the image scanning apparatus 1 may calculate the changeless interval CSLI and the detection interval DLI. Further, when the detection interval DLI is not identical to the changeless interval CSLI, the image scanning apparatus 1 may display the notification representing the rotational skew state on the display 95. Thereby, the image scanning apparatus 1 may provide a notification representing that the skew angle SA of the document sheet Q is varying, without making an inappropriate skew correction.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of its versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

[Modifications]

In the aforementioned illustrative embodiment, aspects of the present disclosure are applied to the image scanning apparatus 1. Nonetheless, aspects of the present disclosure may be applied to a multi-function peripheral having a printer. The aforementioned illustrative embodiment has presented an example in which each of the line sensors 20 includes a contact image sensor. Nonetheless, each of the line sensors 20 may include a reduction optical system image sensor, instead of the contact image sensor.

In the aforementioned illustrative embodiment, the document tray 10 is configured as a center registration type document tray. Nonetheless, the document tray 10 may be configured as a side registration type document tray. In this case, an ultrasonic sensor disposed near a reference side end of a document sheet may be used as a distance sensor. Further, another distance sensor may be changed depending on a document size of the document sheet.

In the aforementioned illustrative embodiment, the changeless interval CDLI is calculated by subtracting the first position LP1 from the second position LP2. Nonetheless, the changeless interval CDLI may be calculated in a different method. The changeless interval CDLI may be appropriately adjusted as needed depending on detectable ranges of an ultrasonic sensor.

In the aforementioned illustrative embodiment, the first threshold TH1, the second threshold TH2, and the third threshold TH3 are used to determine a distance from the center position of each ultrasonic sensor to the side end of the document sheet Q. Nonetheless, different thresholds may be used. Further, the number of the thresholds may not necessarily be limited to three, but may be four or more.

Associations between elements exemplified in the aforementioned illustrative embodiment and elements according to aspects of the present disclosure will be exemplified below. The image scanning apparatus 1 may be an example of an "image scanning apparatus" according to aspects of the present disclosure. The document tray 10 may be an example of a "document tray" according to aspects of the present disclosure. The pickup roller 31, the separation pad 32, the conveyance path 40, the conveyance rollers 41, 42, 45, and 46, the motor controller 80, the conveyance motor 51, and the transmission mechanism 52 may be included in a "conveyor" according to aspects of the present disclosure. The line sensors 20 and the scanning controller 70 may be included in an "image scanner" according to aspects of the present disclosure. At least one of the ultrasonic sensors UB, UC, UD, and UE may be an example of "at least one distance detector" according to aspects of the present disclosure. The RAM 65 may be an example of a "storage" according to aspects of the present disclosure. The main controller 60 may be an example of a "controller" according to aspects of the present disclosure. Namely, the CPU 61 and the ROM 63 storing the programs 63A may be included in the "controller" according to aspects of the present disclosure. The right distance sensor RL or the left distance sensor LL may be an example of a "first distance detector" according to aspects of the present disclosure. The right distance sensor RL or the left distance sensor LL may be an example of a "second distance detector" according to aspects of the present disclosure. The first position LP1 may be an example of a "first position" according to aspects of the present disclosure. The second position LP2 may be an example of a "second position" according to aspects of the present disclosure. The third position LP3 may be an example of a "third position" according to aspects of the present disclosure. The radius CR1 may be an example of a "first particular distance" according to aspects of the present disclosure. The radius CR2 may be an example of a "second particular distance" according to aspects of the present disclosure. The radius CR3 may be an example of a "third particular distance" according to aspects of the present disclosure. The first threshold TH1 may be an example of a "first value" according to aspects of the present disclosure. The second threshold TH2 may be an example of a "second value" according to aspects of the present disclosure. The third threshold TH3 may be an example of a "third value" according to aspects of the present disclosure. The target sensor TL may be an example of a "target detector" according to aspects of the present disclosure. The non-target sensor NTL may be an example of a "non-target detector" according to aspects of the present disclosure.

What is claimed is:

1. An image scanning apparatus comprising:
a document tray;
an image scanner configured to scan an image of a document sheet being conveyed from the document tray, along a main scanning direction;
a conveyor configured to convey the document sheet placed on the document tray, in a conveyance direction perpendicular to the main scanning direction;
at least one distance detector disposed downstream of the document tray in the conveyance direction and in a particular position in the main scanning direction, the at least one distance detector being configured to output a detection signal having a value corresponding to a distance between the at least one distance detector and a side end of the document sheet being conveyed by the conveyor, the side end being a side of the document sheet that is substantially along the conveyance direction;
a storage; and
a controller configured to perform:
a first determining process to determine whether the value of the detection signal from the at least one distance detector is equal to or more than a first value corresponding to a first particular distance in response to the side end of the document sheet being brought within the first particular distance from the at least one distance detector;
a first storing process to, when determining that the value of the detection signal from the at least one distance detector is equal to or more than the first value, store into the storage a first position of the document sheet in the conveyance direction relative to an initial position of the document sheet placed on the document tray, the first position being a position of the document sheet at a point of time when the side end of the document sheet is brought within the first particular distance from the at least one distance detector;
a second determining process to determine whether the value of the detection signal from the at least one distance detector is equal to or more than a second value corresponding to a second particular distance in response to the side end of the document sheet being brought within the second particular distance from the at least one distance detector, the second particular distance being shorter than the first particular distance;
a second storing process to, when determining that the value of the detection signal from the at least one distance detector is equal to or more than the second value, store into the storage a second position of the document sheet in the conveyance direction relative to the initial position, the second position being a position of the document sheet at a point of time when the side end of the document sheet is brought within the second particular distance from the at least one distance detector; and
a skew angle calculating process to calculate a skew angle of the document sheet based on the first position and the second position, the skew angle being an angle, relative to the conveyance direction, of the side end of the document sheet being conveyed by the conveyor.

2. The image scanning apparatus according to claim 1, wherein the skew angle calculating process comprises:
a conveyance distance calculating process to calculate a conveyance distance by subtracting the first position from the second position;
a detection distance calculating process to calculate a detection distance by subtracting the second particular distance from the first particular distance; and
an arc sine calculating process to calculate the skew angle by calculating an arc sine of the detection distance divided by the conveyance distance.

3. The image scanning apparatus according to claim 1, wherein the at least one distance detector includes:
a first distance detector disposed downstream of the document tray in the conveyance direction and in a first particular position in the main scanning direction, the first distance detector being configured to output a detection signal having a value corresponding to a distance between the first distance detector and a first side end of the document sheet being conveyed by the conveyor, the first side end being a side of the document sheet that is substantially along the conveyance direction; and
a second distance detector disposed downstream of the document tray in the conveyance direction and in a second particular position in the main scanning direction, the second distance detector being configured to output a detection signal having a value corresponding to a distance between the second distance detector and a second side end of the document sheet being conveyed by the conveyor, the second side end being an opposite side end of the first side end, and
wherein the first storing process comprises:
a third storing process to, when determining that the value of the detection signal from the first distance detector is equal to or more than the first value, determine that the document sheet is being conveyed in a state rotated in a first direction, and store the first position into the storage; and
a fourth storing process to, when determining that the value of the detection signal from the first distance detector is less than the first value and that the second distance detector has output a detection signal equal to or more than the first value, determine that the document sheet is being conveyed in a state rotated in a second direction opposite to the first direction, and store the first position into the storage.

4. The image scanning apparatus according to claim 3, wherein the controller is further configured to perform a setting process comprising:
when determining that the document sheet is being conveyed in the state rotated in the first direction, setting the first distance detector as a target detector and setting the second distance detector as a non-target detector; and
when determining that the document sheet is being conveyed in the state rotated in the second direction, setting the second distance detector as the target detector and setting, the first distance detector as the non-target detector, and
wherein the second storing process comprises:
a fifth storing process to, when determining that the value of the detection signal from the target detector is equal to or more than the second value, store the second position into the storage; and
a skew determining process to, when determining that the target detector has not output a detection signal having the second value and that the non-target detector has output a detection signal having the first value, determine that the document sheet being conveyed by the conveyor is not skewed.

5. The image scanning apparatus according to claim 4, wherein the controller is further configured to perform:
a third determining process to determine whether the value of the detection signal from the target detector is equal to or more than a third value corresponding to a third particular distance, the third particular distance being shorter than the second particular distance;
a position interval calculating process to calculate a position interval based on the first position and the second position, the position interval being equivalent to a distance in the conveyance direction from the second position to a third position of the document sheet in the conveyance direction relative to the initial position, under an assumption that the skew angle of the document sheet being conveyed by the conveyor is not varying, the third position being a position of the document sheet at a point of time when the target detector has output the detection signal having the third value;
a detection distance calculating process to, when determining that the target detector has output a detection signal having the third value, calculate a detection distance by subtracting the second position from the third position;
a detection distance determining process to determine whether the detection distance is identical to the position interval; and
a rotational skew determining process comprising:
when determining that the detection distance is identical to the position interval, determining that the skew angle of the document sheet being conveyed by the conveyor is not varying; and
when determining that the detection distance is not identical to the position interval, determining that the skew angle of the document sheet being conveyed by the conveyor is varying.

6. The image scanning apparatus according to claim 5, wherein a difference between the first particular distance and the second particular distance is identical to a difference between the second particular distance and the third particular distance, and
wherein the position interval calculating process comprises calculating the position interval by subtracting the first position from the second position.

7. The image scanning apparatus according to claim 5, wherein the controller is further configured to perform:
a scanning process to control the image scanner to scan the image of the document sheet on a line-by-line basis along the main scanning direction while controlling the conveyor to convey the document sheet in the conveyance direction, thereby acquiring scanned image data;
a correcting process comprising:
when determining that the skew angle of the document sheet being conveyed by the conveyor is not varying and that the document sheet is being conveyed in the state rotated in the first direction, correcting the scanned image data by rotating the scanned image data by the skew angle in the second direction; and
when determining that the skew angle of the document sheet being conveyed by the conveyor is not varying and that the document sheet is being conveyed in the state rotated in the second direction, correcting the scanned image data by rotating the scanned image data by the skew angle in the first direction; and
a notifying process to, when determining that the skew angle of the document sheet being conveyed by the conveyor is varying, provide a notification that the skew angle of the document sheet being conveyed by the conveyor is varying.

8. The image scanning apparatus according to claim 7, further comprising a display,
wherein the notifying process comprises:
a display process to, when determining that the skew angle of the document sheet being conveyed by the conveyor is varying, control the display to display the notification that the skew angle of the document sheet being conveyed by the conveyor is varying.

9. The image scanning apparatus according to claim 3, wherein the controller is further configured to perform:
a scanning process to control the image scanner to scan the image of the document sheet on a line-by-line basis along the main scanning direction while controlling the conveyor to convey the document sheet in the conveyance direction, thereby acquiring scanned image data; and
a correcting process comprising:
when determining that the document sheet is being conveyed in the state rotated in the first direction, correcting the scanned image data by rotating the scanned image data by the skew angle in the second direction; and
when determining that the document sheet is being conveyed in the state rotated in the second direction, correcting the scanned image data by rotating the scanned image data by the skew angle in the first direction.

10. The image scanning apparatus according to claim 1, wherein the controller is further configured to perform:
a scanning process to control the image scanner to scan the image of the document sheet on a line-by-line basis along the main scanning direction while controlling the conveyor to convey the document sheet in the conveyance direction, thereby acquiring scanned image data; and
a correcting process to correct the scanned image data by rotating the scanned image data based on the skew angle.

11. The image scanning apparatus according to claim 1, wherein the controller comprises:
a processor; and
a memory storing processor-executable instructions configured to, when executed by the processor, cause the processor to perform the first determining process, the first storing process, the second determining process, the second storing process, and the skew angle calculating process.

12. A method implementable on a processor coupled with an image scanning apparatus, the image scanning apparatus comprising:
a document tray;
an image scanner configured to scan an image of a document sheet being conveyed from the document tray, along a main scanning direction;
a conveyor configured to convey the document sheet placed on the document tray, in a conveyance direction perpendicular to the main scanning direction;

a distance detector disposed downstream of the document tray in the conveyance direction and in a particular position in the main scanning direction, the distance detector being configured to output a detection signal having a value corresponding to a distance between the distance detector and a side end of the document sheet being conveyed by the conveyor, the side end being a side of the document sheet that is substantially along the conveyance direction; and a storage, the method comprising:

a first determining process of determining whether the value of the detection signal from the distance detector is equal to or more than a first value corresponding to a first particular distance in response to the side end of the document sheet being brought within the first particular distance from the distance detector;

a first storing process of, when determining that the value of the detection signal from the distance detector is equal to or more than the first value, storing into the storage a first position of the document sheet in the conveyance direction relative to an initial position of the document sheet placed on the document tray, the first position being a position of the document sheet at a point of time when the side end of the document sheet is brought within the first particular distance from the distance detector;

a second determining process of determining whether the value of the detection signal from the distance detector is equal to or more than a second value corresponding to a second particular distance in response to the side end of the document sheet being brought within the second particular distance from the distance detector, the second particular distance being shorter than the first particular distance;

a second storing process of, when determining that the value of the detection signal from the distance detector is equal to or more than the second value, storing into the storage a second position of the document sheet in the conveyance direction relative to the initial position, the second position being a position of the document sheet at a point of time when the side end of the document sheet is brought within the second particular distance from the distance detector; and a skew angle calculating process of calculating a skew angle of the document sheet based on the first position and the second position, the skew angle being an angle, relative to the conveyance direction, of the side end of the document sheet being conveyed by the conveyor.

13. A non-transitory computer-readable medium storing computer-readable instructions that are executable by a processor coupled with an image scanning apparatus, the image scanning apparatus comprising:

a document tray;

an image scanner configured to scan an image of a document sheet being conveyed from the document tray, along a main scanning direction;

a conveyor configured to convey the document sheet placed on the document tray, in a conveyance direction perpendicular to the main scanning direction;

at least one distance detector disposed downstream of the document tray in the conveyance direction and in a particular position in the main scanning direction, the at least one distance detector being configured to output a detection signal having a value corresponding to a distance between the at least one distance detector and a side end of the document sheet being conveyed by the conveyor, the side end being a side of the document sheet that is substantially along the conveyance direction; and a storage, the instructions being configured to, when executed by the processor, cause the processor to perform:

a first determining process to determine whether the value of the detection signal from the at least one distance detector is equal to or more than a first value corresponding to a first particular distance in response to the side end of the document sheet being brought within the first particular distance from the at least one distance detector;

a first storing process to, when determining that the value of the detection signal from the at least one distance detector is equal to or more than the first value, store into the storage a first position of the document sheet in the conveyance direction relative to an initial position of the document sheet placed on the document tray, the first position being a position of the document sheet at a point of time when the side end of the document sheet is brought within the first particular distance from the at least one distance detector;

a second determining process to determine whether the value of the detection signal from the at least one distance detector is equal to or more than a second value corresponding to a second particular distance in response to the side end of the document sheet being brought within the second particular distance from the at least one distance detector, the second particular distance being shorter than the first particular distance;

a second storing process to, when determining that the value of the detection signal from the at least one distance detector is equal to or more than the second value, store into the storage a second position of the document sheet in the conveyance direction relative to the initial position, the second position being a position of the document sheet at a point of time when the side end of the document sheet is brought within the second particular distance from the at least one distance detector; and a skew angle calculating process to calculate a skew angle of the document sheet based on the first position and the second position, the skew angle being an angle, relative to the conveyance direction, of the side end of the document sheet being conveyed by the conveyor.

14. The non-transitory computer-readable medium according to claim 13, wherein the skew angle calculating process comprises:

a conveyance distance calculating process to calculate a conveyance distance by subtracting the first position from the second position;

a detection distance calculating process to calculate a detection distance by subtracting the second particular distance from the first particular distance; and an arc sine calculating process to calculate the skew angle by calculating an arc sine of the detection distance divided by the conveyance distance.

15. The non-transitory computer-readable medium according to claim 13, wherein the at least one distance detector includes:

a first distance detector disposed downstream of the document tray in the conveyance direction and in a first particular position in the main scanning direction, the first distance detector being configured to output a detection signal having a value corresponding to a distance between the first distance detector and a first side end of the document sheet being conveyed by the conveyor, the first side end being a side of the document sheet that is substantially along the conveyance direction; and a second distance detector disposed downstream of the document tray in the conveyance direction and in a second particular position in the main scanning direction, the second distance detector being configured to output a detection signal having a value corresponding to a distance between the second distance detector and a second side end of the document sheet being conveyed by the conveyor, the second side end being an opposite side end of the first side end, and wherein the first storing process comprises:

a third storing process to, when determining that the value of the detection signal from the first distance detector is equal to or more than the first value, determine that the document sheet is being conveyed in a state rotated in a first direction, and store the first position into the storage; and a fourth storing process to, when determining that the value of the detection signal from the first distance detector is less than the first value and that the second distance detector has output a detection signal equal to or more than the first value, determine that the document sheet is being conveyed in a state rotated in a second direction opposite to the first direction, and store the first position into the storage.

16. The non-transitory computer-readable medium according to claim 15, wherein the instructions are further configured to, when executed by the processor, cause the processor to perform a setting process comprising:

when determining that the document sheet is being conveyed in the state rotated in the first direction, setting the first distance detector as a target detector and setting the second distance detector as a non-target detector; and when determining that the document sheet is being conveyed in the state rotated in the second direction, setting the second distance detector as the target detector and setting the first distance detector as the non-target detector, and wherein the second storing process comprises:

a fifth storing process to, when determining that the value of the detection signal from the target detector is equal to or more than the second value, store the second position into the storage; and a skew determining process to, when determining that the target detector has not output a detection signal having the second value and that the non-target detector has output a detection signal having the first value, determine that the document sheet being conveyed by the conveyor is not skewed.

17. The non-transitory computer-readable medium according to claim 16, wherein the instructions are further configured to, when executed by the processor, cause the processor to perform:

a third determining process to determine whether the value of the detection signal from the target detector is equal to or more than a third value corresponding to a third particular distance, the third particular distance being shorter than the second particular distance;

a position interval calculating process to calculate a position interval based on the first position and the second position, the position interval being equivalent to a distance in the conveyance direction from the second position to a third position of the document sheet in the conveyance direction relative to the initial position, under an assumption that the skew angle of the document sheet being conveyed by the conveyor is not varying, the third position being a position of the document sheet at a point of time when the target detector has output the detection signal having the third value;

a detection distance calculating process to, when determining that the target detector has output a detection signal having the third value, calculate a detection distance by subtracting the second position from the third position;

a detection distance determining process to determine whether the detection distance is identical to the position interval; and a rotational skew determining process comprising:

when determining that the detection distance is identical to the position interval, determining that the skew angle of the document sheet being conveyed by the conveyor is not varying; and when determining that the detection distance is not identical to the position interval, determining that the skew angle of the document sheet being conveyed by the conveyor is varying.

18. The non-transitory computer-readable medium according to claim 17, wherein a difference between the first particular distance and the second particular distance is identical to a difference between the second particular distance and the third particular distance, and wherein the position interval calculating process comprises calculating the position interval by subtracting the first position from the second position.

19. The non-transitory computer-readable medium according to claim 15, wherein the instructions are further configured to, when executed by the processor, cause the processor to perform:

a scanning process to control the image scanner to scan the image of the document sheet on a line-by-line basis along the main scanning direction while controlling the conveyor to convey the document sheet in the conveyance direction, thereby acquiring scanned image data; and a correcting process comprising:

when determining that the document sheet is being conveyed in the state rotated in the first direction, correcting the scanned image data by rotating the scanned image data by the skew angle in the second direction; and when determining that the document sheet is being conveyed in the state rotated in the second direction, correcting the scanned image data by rotating the scanned image data by the skew angle in the first direction.

20. The non-transitory computer-readable medium according to claim 13, wherein the instructions are further configured to, when executed by the processor, cause the processor to perform:

a scanning process to control the image scanner to scan the image of the document sheet on a line-by-line basis along the main scanning direction while controlling the conveyor to convey the document sheet in the conveyance direction, thereby acquiring scanned image data; and a correcting process to correct the scanned image data by rotating the scanned image data based on the skew angle.

* * * * *